(12) United States Patent
Heo et al.

(10) Patent No.: US 9,568,097 B2
(45) Date of Patent: Feb. 14, 2017

(54) DEVICE AND METHOD FOR DRIVING SHIFT LEVER

(71) Applicants: Hyundai Motor Company, Seoul (KR); Kia Motors Corporation, Seoul (KR); SL Corporation, Daegu (KR)

(72) Inventors: Jae Sung Heo, Suwon-Si (KR); Ki Young Song, Seoul (KR); Joon Young Park, Suwon-Si (KR); Chang Hyun Lee, Seoul (KR); Han Gil Park, Suwon-Si (KR); Ean Soo Cho, Hwaseong-Si (KR); Nam Sik Baek, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 17 days.

(21) Appl. No.: 14/525,878

(22) Filed: Oct. 28, 2014

(65) Prior Publication Data

US 2015/0362068 A1 Dec. 17, 2015

(30) Foreign Application Priority Data

Jun. 11, 2014 (KR) ........................ 10-2014-0070765

(51) Int. Cl.
- *F16H 21/00* (2006.01)
- *G05G 1/00* (2006.01)
- *F16H 61/24* (2006.01)
- *F16H 59/10* (2006.01)
- *F16H 59/00* (2006.01)

(52) U.S. Cl.
CPC ............ *F16H 61/24* (2013.01); *F16H 59/105* (2013.01); *F16H 59/00* (2013.01); *F16H 59/10* (2013.01); *F16H 2061/241* (2013.01); *Y10T 74/20085* (2015.01)

(58) Field of Classification Search
None
See application file for complete search history.

(56) References Cited

U.S. PATENT DOCUMENTS

| 2011/0132124 A1* | 6/2011 | Park ................. F16H 59/0204 74/473.18 |
| 2014/0020496 A1* | 1/2014 | Heo .................. F16H 59/0204 74/473.12 |
| 2015/0040708 A1* | 2/2015 | Lee ........................ F16H 59/08 74/473.3 |

FOREIGN PATENT DOCUMENTS

| JP | 2-56970 U | 4/1990 |
| KR | 10-0800126 | 1/2008 |
| KR | 10-2009-0131497 | 12/2009 |
| KR | 10-2011-0062880 | 6/2011 |
| KR | 10-2011-0062888 A | 6/2011 |

(Continued)

*Primary Examiner* — Jerrah Edwards
*Assistant Examiner* — Demetra Smith-Stewart
(74) *Attorney, Agent, or Firm* — Morgan, Lewis & Bockius LLP

(57) ABSTRACT

Disclosed are device and method for driving a shift lever. The device may include a control unit that sets a travel distance of the shift lever when the shift lever is manipulated to a predetermined shift stage to be different than a reference travel distance of the shift lever, which is a travel distance of the shift lever when the shift lever is manipulated to shift stages other than the predetermined shift stage. The device may further include a driving unit which restricts a travel of the shift lever or moves the shift lever depending on a setting of the control unit.

8 Claims, 3 Drawing Sheets

(56) References Cited

FOREIGN PATENT DOCUMENTS

| KR | 10-1199043 | 11/2012 |
|---|---|---|
| KR | 10-1459960 B1 | 11/2014 |
| KR | 10-2015-0018188 A | 2/2015 |

\* cited by examiner

DEVICE AND METHOD FOR DRIVING SHIFT LEVER

CROSS REFERENCE TO RELATED APPLICATION

The present application claims priority of Korean Patent Application Number 10-2014-0070765 filed on Jun. 11, 2014, the entire contents of which application are incorporated herein for all purposes by this reference.

BACKGROUND OF INVENTION

Field of Invention

The present invention relates, in general, to a device and method for driving a shift lever and, more particularly, to a device and method for driving a shift lever which changes the travel distance of a shift lever when shifting to a specific shift stage such that a driver can easily recognize the specific shift stage.

Description of Related Art

Vehicles are provided with a transmission between an engine and a drive shaft in order to improve fuel efficiency and enable efficient driving. Drivers set the transmission to a specific shift stage by manipulating a shift lever provided inside a vehicle.

Typically, transmission systems of vehicles can be categorized into manual and automatic transmission systems. In a manual transmission system, a shift lever is directly connected to a transmission such that a driver directly manipulates the transmission. In an automatic transmission system, when a driver manipulates a shift lever in the shifting order of the P, R, N and D positions, a transmission is electronically operated to perform gear shifting.

Various shift lever models for automatic transmissions have been developed and proposed. An electronic shift lever, so-called a shift-by-wire shift lever, has recently been introduced and is increasingly applied to transmissions. The shift-by-wire shift lever performs gear shifting processes in response to a driver moving a shift lever forward and backward once or twice.

The shift-by-wire shift lever uses a fixed position where the shift lever is constantly located and a travel position to which the shift lever travels before returning to the fixed position in addition to a shifting order of P-R-N-D, which has been used in automatic transmissions of the related art. In this manner, the shift-by-wire shift lever can be located at the fixed position while traveling in the order of P-R-N-D, thereby reducing the space which the shift lever occupies and maximizing driver convenience.

However, after the shift lever has been used to change gears, the shift lever remains at a fixed position regardless of the shift stage. Therefore, there is an inconvenience in that, when a driver wants to recognize at which shift stage a vehicle is, he/she must visually check the state of the shift stage.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a device and method for driving a shift lever which changes the travel distance of a shift lever when shifting to a specific shift stage, for example, the park position such that a driver can easily recognize the specific shift stage.

According to various aspects of the present invention, there is provided a device for driving a shift lever comprising a control unit. The control unit may set a travel distance of the shift lever when the shift lever is manipulated to a predetermined shift stage to be different than a reference travel distance of the shift lever, which is a travel distance of the shift lever when the shift lever is manipulated to shift stages other than the predetermined shift stage.

The device may further include a driving unit which restricts a travel of the shift lever or moves the shift lever depending on a setting of the control unit. The driving unit may be a voice coil motor.

The control unit may set a travel distance of the shift lever when the shift lever is manipulated from a present shift stage to the shift stages other than the predetermined shift stage to be different than the reference travel distance. The control unit may set the travel distance of the shift lever when the shift lever is manipulated from the present shift stage to the shift stages other than the predetermined shift stage to be equal to a travel distance of the shift lever when the shift lever is manipulated to the predetermined shift stage. The predetermined shift stage may be a park position.

The control unit may control the driving unit such that the driving unit moves the shift lever to a predetermined position regardless of a position of the shift lever after the shift lever is manipulated to the predetermined shift stage.

According to various other aspects of the present invention, there is provided a method of driving a shift lever. The method may include the following steps of: detecting a position of a shift lever and a shift stage; and if the detected position of the shift lever is located at a predetermined position and the shift stage is the predetermined position, setting a travel distance of the shift lever when the shift lever is manipulated to an adjacent shift stage to be different than a reference travel distance of the shift lever, which is a travel distance of the shift lever when the shift lever is manipulated to shift stages other than a predetermined shift stage. The method may further include the step of, after the shift lever is manipulated to the predetermined shift stage, moving the shift lever to the predetermined position regardless of a position of the shift lever.

According to the device and/or method for driving a shift lever of the present invention, the driver can predict a change in the shift stage in response to the manipulation of the shift lever based on the sensation of the manipulation of the shift lever without checking the state of the shift stage, and thus user convenience can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
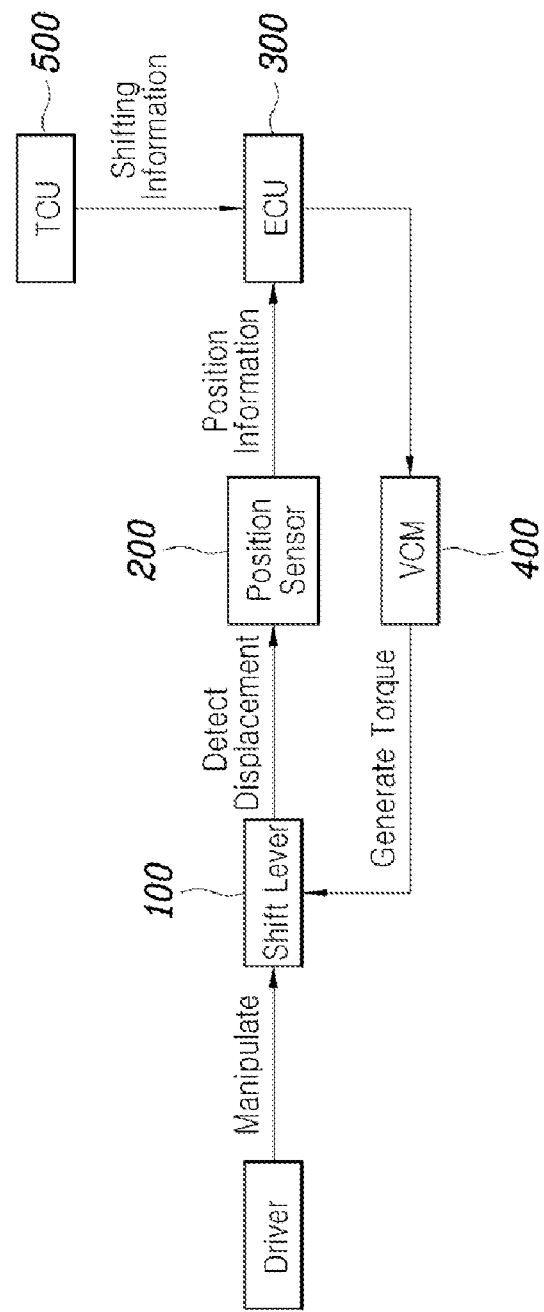
FIG. 1 is a block diagram showing an exemplary device for driving a shift lever according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to a device and method for driving a shift lever according to the present invention, exemplary embodiments of which are illustrated in the accompanying drawings. Wherever possible, the same reference numerals will be used throughout the drawings and the description to refer to the same or like parts.

Although it will be illustrated in the following exemplary embodiments of the invention that a shift lever 100 is a shift-by-wire shift lever, this is not intended to be limiting. It is intended, however, that the same applies to mechanical shift levers and other various types of shift levers without departing from the principle of the present invention.

FIG. 1 is a block diagram showing a device for driving a shift lever according to various exemplary embodiments of the invention. The device for driving a shift lever (hereinafter referred to as the "shift lever driving device") includes a control unit 300. The control unit 300 sets the travel distance of the shift lever 100 when the shift lever 100 is manipulated to a preset shift stage to differ from a reference travel distance of the shift lever 100, which is a travel distance of the shift lever 100 when the shift lever 100 is manipulated to shift stages other than the preset shift stage.

The shift lever driving device can further include a driving unit 400 which restricts the travel of the shift lever 100 or moves the shift lever 100 depending on the setting of the control unit 300.

The driving unit 400 can vary the sensation of manipulation of the shift lever 100 by applying reverse torque to the shift lever 100 or fix the shift lever 100 to a specific position by restricting the travel of the shift lever 100 when manipulating the shift lever 100. The driving unit 400 can also move the shift lever 100 to a specific position such that the shift lever 100 is located at the specific position.

In some embodiments, the driving unit 400 is preferably implemented as a voice coil motor (VCM) for rapid response and ease of control, but this is not intended to be limiting. A description of the operation structure of the VCM will be omitted since it is similar to or the same as those described in the related art.

Specifically, the control unit 300 controls the driving unit 400 to provide a driver with a tactile sensation that the shift lever 100 is locked whenever the shift lever 100 travels the reference travel distance, and preferably has a plurality of shift positions such that the control unit 300 can locate the shift lever 100 at the plurality of shift positions by restricting the travel of the shift lever 100. The number of the plurality of shift positions can vary depending on the setting by the control unit 300. The distances between the shift positions, i.e. the distances that the shift lever 100 travels during shifting to specific shift stages, can also be set to various distances. The various shift positions are not absolute positions but indicate relative positions to which the shift lever 100 can travel.

Whenever the shift lever 100 travels to each shift position, the control unit 300 controls gear shifting to be performed in a preset order, in a direct manner or by means of a transmission control unit (TCU) 500. The control unit 300 also receives information on the current shift stage of a vehicle and varies the travel distance of the shift lever 100, details of which will be described later.

The plurality of shift positions may include reference positions where the shift lever 100 is constantly located and a plurality of variable positions which is arranged in the forward or backward direction of the reference position depending on the direction in which the shift lever 100 travels.

Although the number of the reference positions and the number of the variable positions can be set variously, it will be described by way of illustration in this embodiment that the shift positions include a first reference position S1, a second reference position S2 adjacent to the first reference position S1, first and second variable positions US1 and US2 which are arranged successively in the forward direction of the first reference position S1 and third and fourth variable positions US3 and US4 which are arranged successively in the backward direction of the second reference position S2. The forward direction refers to a direction toward the first reference position S1 from the second reference position S2, and the backward direction refers to a direction toward the second reference position S2 from the first reference position S1. It is of course possible that the direction be changed and the shifting order be set variously.

Figure 2:
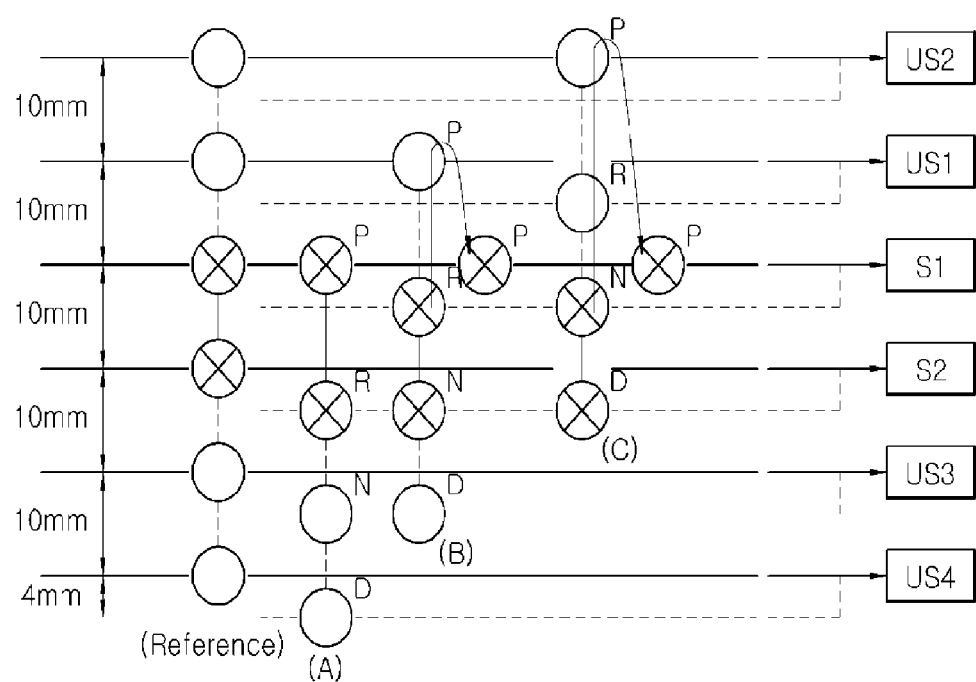
FIG. 2 is a diagram showing a plurality of shift positions of an exemplary device for driving a shift lever according to the present invention.

FIG. 2 is a diagram showing courses along which the shift lever travels on a plurality of shift positions when a shift stage is changed. When the first reference position S1 is the park stage as shown in part (A) of FIG. 2, the shift lever 100 travels in the backward direction of the first reference position S1 in the order of P-R-N-D in response to manipulation. At this time, when the shift lever 100 is located at the third variable position or the fourth variable position for shifting to the N or D position, the driving unit 400 returns the shift lever 100 to the second reference position S2 after the shift lever 100 is located at the corresponding variable position, and shifting to the N or D position is performed. Here, the letter "P" indicates the park shift position, "R" indicates the reverse position, "N" indicates the neutral position, and "D" indicates the drive position.

When the shift lever 100 has shifted to the N position, as shown in part (B) of FIG. 2, the shift lever 100 is located at the second reference position. When the shift lever 100 is moved in the forward direction for the purpose of shifting to the R or P position, the shift lever 100 travels to the first reference position S1 or the first variable position US1.

When the shift lever 100 is located at the first reference position S1, the shift lever 100 stays at the first reference position S1 without traveling to the second reference position S2. When the shift lever 100 is located at the first variable position US1, shifting to the P position is performed, and the drive unit 400 returns the shift lever 100 again to the first reference position S1.

Traveling in part (C) of FIG. 2 can also be applied in the similar manner. Specifically, when the shift lever 100 is located at the first variable position US1 or the second variable position US2, shifting to the R position or the P position is carried out, and the shift lever 100 is also returned to the first reference position S1 by the driving unit 400.

In addition, when the shift lever 100 is manipulated to the preset shift stage, the control unit 300 can set the travel distance of the shift lever 100 different from the preset reference travel distance which the shift lever 100 travels when the shift lever 100 is manipulated to a shift stage other than the preset shift stage.

More specifically, the preset shift stage is preferably the park position. According to the P-R-N-D order of the shift lever 100, the travel distance of the shift lever 100 when shifting from the R position to the P position can be set different from the travel distance of the shift lever 100 along the R-N-D positions. For example, provided the reference travel distance, i.e. the travel distance of the shift lever 100 along the R-N-D positions, is 10 mm, it is possible to set that shifting is performed by a travel of 14 mm when moving the shift lever 100 from the R position to the P position. Therefore, when the P position is located at the first reference position, the distance between the first reference position S1 and the third variable position US3 is set to be 14 mm. When the P position is located at the first variable position US1, the distance between the first variable position US1 and the first reference position S1 is set to be 14 mm. When the P position is located at the second variable position US2, the distance between the first variable position US1 and the second variable position US2 is set to be 14 mm.

The preset shift stage is not limited to the P position but can be any other shift position as intended such as by a designer. That is, the preset shift stage can be any one of the R, N and D positions, can be two or more positions instead of being one position, and can be any other added shift position than the P, R, N and D positions, for example, a shift position to a sport mode or a manual mode.

In addition, the control unit 300 can set a travel distance different from the reference travel distance when the shift is manipulated from the preset shift stage to any shift stage other than the preset shift stage. Specifically, when the preset shift stage is the P position and the present shift state is the P position, a travel distance when shifting from the P position to the R position can be set different from the travel distance when shifting along the R-N-D positions. Although the travel distance of the shift lever 100 from the P position to the R position and the travel distance of the shift lever 100 from the R position to the P position can be set different from each other, in some embodiments, they are preferably set equal.

Due to the above-described or similar configuration, the travel distance of the shift lever 100 when shifting to the preset shift stage, for example, the P position can be set differently, thereby imparting the sensation of manipulation to the shift lever 100 such that the driver can easily recognize the state of the current shift stage.

After the shift lever 100 is manipulated to the preset shift stage, in some embodiments, it is preferred that the control unit 300 controls the driving unit 400 to move the shift lever 100 to the preset position regardless of the position of the shift lever 100. The preset position is not a relative position at the shift position but an absolute position that is set on the course along which the shift lever 100 actually travels.

Specifically, when shifting from the R position to the P position, the P gear returns to the first reference position S1. Since the travel distance of the shift lever 100 between the R and P positions differs from the travel distance of the shift lever 100 in the other cases, the relative positions between the first reference position S1 and the other variable positions change, as shown in part (A) to (C) of FIG. 2. When the P position returns to the first reference position S1, the first reference position S1 is set to the preset position on the travel course of the shift lever 100. In this manner, whenever the shift lever 100 performs shifting to the P position, the shift lever 100 can be located at the preset position.

For this purpose, in some embodiments, it is preferred that a position sensor which detects the position of the shift lever 100 is further provided.

The above-described or similar configuration makes it possible to offset an accumulative error in the travel distance of the shift lever 100 between the P and R positions such that the accumulative error in the travel distance of the shift lever 100 does not cause the driver to misjudge the shift stage, thereby improving the recognizability of the stage shift by the driver.

Figure 3:
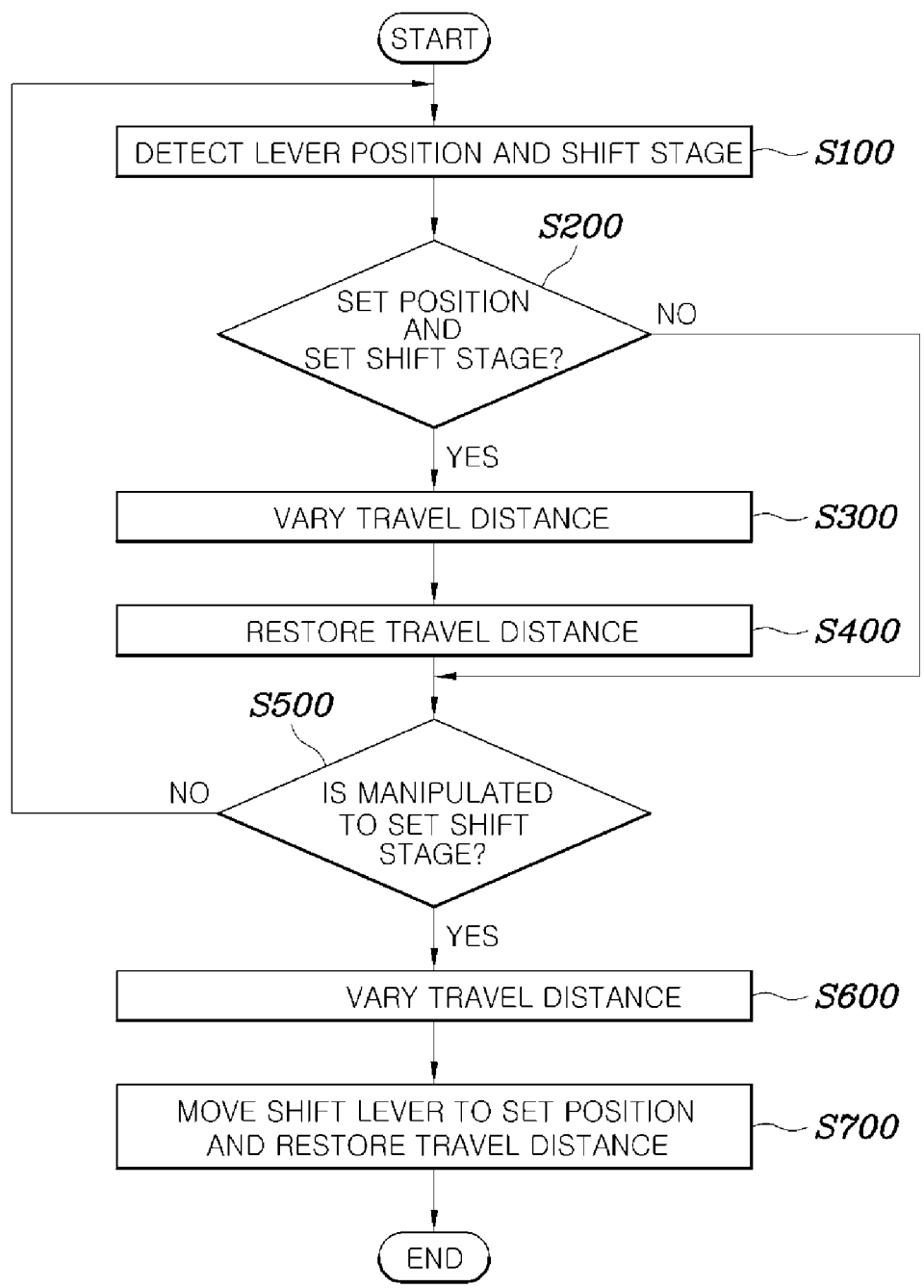
FIG. 3 is a flowchart showing an exemplary method of driving a shift lever according to the present invention.

FIG. 3 is a flowchart showing a method of driving a shift lever according to various exemplary embodiments of the invention. The method of driving a shift lever (hereinafter referred to as the "shift lever driving method"), for example using the above-described or similar configuration, includes step S100 of detecting a position of the shift lever and a shift stage; and step S300 of, if the detected position of the shift lever is located at a preset position and the shift stage is the preset position, setting a travel distance of the shift lever when the shift lever is manipulated to an adjacent shift stage to differ from a reference travel distance of the shift lever 100, which is a travel distance of the shift lever 100 when the shift lever 100 is manipulated to shift stages other than the preset shift stage.

Specifically, at step S200, it is further judged whether or not the shift lever is located at the first reference position S1 in addition to the judgment on whether or not the shift lever is located at the preset position. If the shift lever is located at the first reference position S1 as well as the preset position and the shift stage is the preset shift stage, for example, the P position, the course along which the shift lever can travel is only to the R position. Therefore, at step S300, the travel distance of the shift lever along the respective shift positions is set different from the reference travel distance. For example, the travel distance is set to 14 mm, which differs from the reference travel distance of, for example, 10 mm. At step S400, after shifting is performed, the travel distance between the respective shift positions is set to the reference travel distance.

Afterwards, at step S500, it is judged whether or not the shift lever performs shifting to the P position. At step S600, if the shift lever performs shifting to the P position, the travel distance of the shift lever between the shift position corresponding to the R position and the shift position corresponding to the P position is set again to 14 mm. At step S700, after shifting to the P position is performed, the shift lever is moved to the preset position regardless of the position of the shift lever, and the travel distance of the shift lever between the shift positions is returned to the reference travel distance. P position and 14 mm are provided as examples.

According to the device and/or method for driving a shift lever of the present invention, the driver can predict a change in the shift stage in response to the manipulation of the shift lever based on the sensation of the manipulation of the shift lever without checking the state of the shift stage, and thus user convenience can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for driving a shift lever, comprising:
a control unit setting a first travel distance of the shift lever when the shift lever is manipulated to a predetermined shift stage to be different than a reference travel distance of the shift lever, wherein the reference travel distance is a travel distance of the shift lever when the shift lever is manipulated to shift stages other than the predetermined shift stage,
wherein the control unit sets a second travel distance of the shift lever when the shift lever is manipulated from the predetermined shift stage to the shift stages other than the predetermined shift stage to be different than the reference travel distance.

2. The device according to claim 1, further comprising:
a driving unit which restricts a travel of the shift lever or moves the shift lever depending on a setting of the control unit.

3. The device according to claim 2, wherein the driving unit comprises a voice coil motor.

4. The device according to claim 1, wherein the control unit sets the second travel distance of the shift lever when the shift lever is manipulated from the predetermined shift stage to the shift stages other than the predetermined shift stage to be equal to a third travel distance of the shift lever when the shift lever is manipulated to the predetermined shift stage.

5. The device according to claim 1, wherein the predetermined shift stage comprises a park position.

6. The device according to claim 1, wherein the control unit controls the driving unit such that the driving unit moves the shift lever to a predetermined position regardless of a position of the shift lever after the shift lever is manipulated to the predetermined shift stage.

7. A method of driving a shift lever, comprising:
detecting a position of a shift lever and a shift stage; and
if the detected position of the shift lever is located at a predetermined position and the shift stage is the predetermined position, setting a travel distance of the shift lever when the shift lever is manipulated to an adjacent shift stage to be different than a reference travel distance of the shift lever, which is a travel distance of the shift lever when the shift lever is manipulated to shift stages other than a predetermined shift stage.

8. The method according to claim 7, further comprising:
after the shift lever is manipulated to the predetermined shift stage, moving the shift lever to the predetermined position regardless of a position of the shift lever.

* * * * *